Sept. 14, 1926.  J. A. HUMPHRIES  1,600,044

AUTOMOBILE BUMPER

Filed Jan. 2, 1925

INVENTOR.
James A. Humphries.
BY
Edward N. Pagelsen,
ATTORNEY.

Patented Sept. 14, 1926.

1,600,044

UNITED STATES PATENT OFFICE.

JAMES A. HUMPHRIES, OF DETROIT, MICHIGAN, ASSIGNOR TO MONARCH BUMPER MANUFACTURING COMPANY, OF DETROIT, MICHIGAN, A CORPORATION OF MICHIGAN.

AUTOMOBILE BUMPER.

Application filed January 2, 1925. Serial No. 50.

This invention relates to the construction of bumpers adapted to be attached to the rear ends of motor vehicles to protect the fenders thereof, and its object is to provide a bumper of this character which can be adapted to vehicles of different constructions and which can be adjusted to accommodate spare tires of different sizes.

This invention consists in a substantially triangular bumper embodying an impact member formed of two vertically spaced bars connected at their ends and two supporting members, each attached at one end to one end of the impact member and adapted to be attached at its other end to the frame of the vehicle.

It further consists in the details of construction illustrated in the accompanying drawing and particularly pointed out in the claims.

Figure 1:
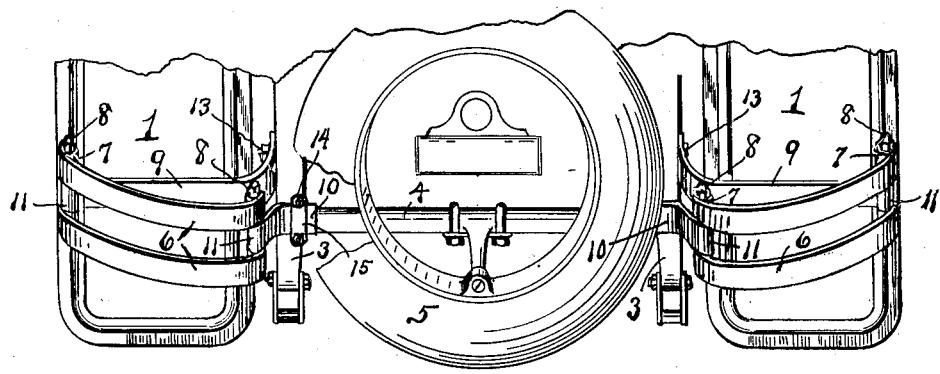
Figure 2:
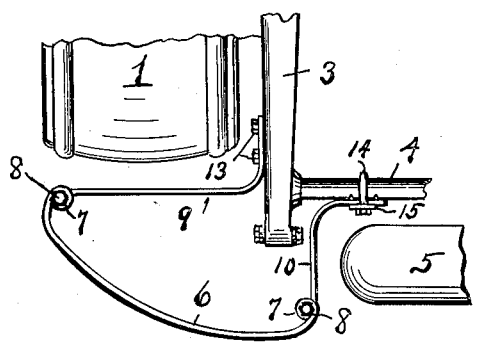
Figure 3:
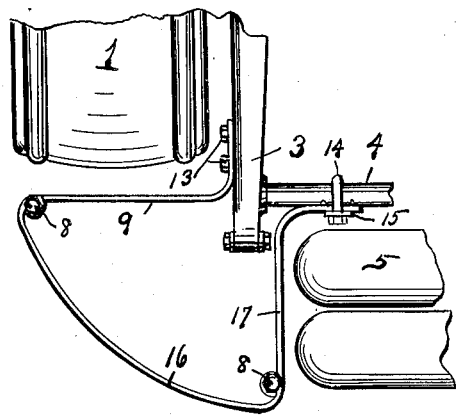
Figure 4:
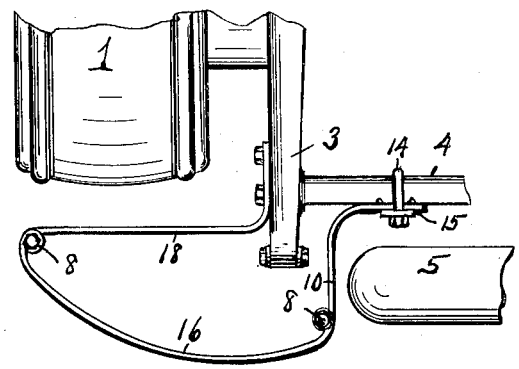

In the drawing, Fig. 1 is a partial rear elevation of an automobile equipped with my improved fenders. Fig. 2 is a plan of the bumper shown in Fig. 1 on a larger scale. Figs. 3 and 4 are plans similar to Fig. 2 with the parts of the bumper somewhat modified.

Similar reference characters refer to like parts throughout the several views.

The fenders 1, the rear ends 3 of the side frames of the chassis, the cross-bar 4 connecting them, and the spare tire 5 may be of any desired construction, a showing of these parts being made merely to demonstrate the present invention. One of my improved bumpers is to be mounted to extend over and protect each fender, and the two bumpers are to be so mounted as to leave space between them for one or two spare tires.

The bumper shown in Figs. 1 and 2 comprises two vertically spaced bars 6 of springsteel, having eyes 7 at their ends to receive the bolts 8. Two brackets 9 and 10 have eyes 11 at their outer ends to receive these bolts 8 and their inner ends may be attached to the chassis members 3 or/and 4 in any desired manner, the bracket 9 being preferably formed with holes to receive the bolts 13 so that it may be positioned quite near to the fender 1. I prefer to attach the bracket 10 to the cross bar 4 by means of the U-bolt 14, using a clamp 15 if necessary. It will be noticed that these attachments are close together so that a substantially triangular bumper is the result.

Whenever two spare tires are to be carried, it is desirable to have the inner ends of the resilient bars 16 project beyond the tires, as shown in Fig. 3. For this purpose the inner bracket 17 is made larger, the outer bracket 9 remaining the same. When therefore an automobile owner wishes to add another spare tire, he can protect it by merely exchanging inner brackets 17, a matter of small cost compared with that of an entire bumper. This is possible because of the joints at the corners of this triangular bumper. The structure shown in Fig. 4 employs the longer bracket 18 instead of the bracket 9 of Fig. 2, and the resilient member 16 of Fig. 3, thus producing a bumper of greater lateral spread than that shown in Fig. 2.

The result I attain therefore is a freely adjustable and adaptable bumper of substantially triangular form whose brackets may be bent or exchanged to provide for variations in the locations of the inner ends of the resilient bars relative to the spare tires which are mounted on the rear ends of the vehicles. Only one of the brackets need be exchanged to adapt this bumper to different makes of automobiles, which is a very valuable consideration from a manufacturing standpoint.

The details and proportions of the several parts of these bumpers may all be changed by those skilled in the art without departing from the spirit of my invention as set forth in the following claims.

I claim:—

1. A triangular bumper to protect the rear fenders and spare tires at the rear ends of automobiles consisting of a curved impact member and brackets extending from the ends thereof and attached to the rear end of the vehicle adjacent each other, the ends of the impact member and the adjacent ends of the brackets being in the form of eyes, and pivot bolts connecting the bars and brackets to permit adjustment of the brackets on their supports.

2. A triangular bumper to protect the rear fenders and spare tires at the rear ends of automobiles consisting of a pair of curved resilient bars and brackets extending from the ends thereof and attached to the rear end of the chassis of the vehicle adjacent each other, the ends of the resilient bars and the adjacent ends of the brackets being in the form of eyes, and pivot bolts connecting the bars and brackets to permit adjustment of the brackets on their supports.

3. A triangular bumper to protect the rear fenders of automobiles consisting of an impact member having its ends formed into eyes, brackets extending from the ends of the impact member to a support on the vehicle and having their outer ends formed into eyes, and pivot bolts connecting the bars and brackets.

JAMES A. HUMPHRIES.